US 6,731,369 B2

(12) United States Patent
Choo (10) Patent No.: US 6,731,369 B2
(45) Date of Patent: May 4, 2004

(54) LIQUID CRYSTAL DISPLAY DEVICE HAVING IMPROVED ADHESION OF A SEAL PATTERN

(75) Inventor: Kyo-Seop Choo, Gumi-si (KR)

(73) Assignee: LG.Philips LCD Co., Ltd., Seoul (KR)

( * ) Notice: Subject to any disclaimer, the term of this patent is extended or adjusted under 35 U.S.C. 154(b) by 44 days.

(21) Appl. No.: 10/222,838

(22) Filed: Aug. 19, 2002

(65) Prior Publication Data

US 2003/0038913 A1 Feb. 27, 2003

(30) Foreign Application Priority Data

Aug. 21, 2001 (KR) .......................... 2001-50165

(51) Int. Cl.$^7$ ..................... G02F 1/1343; G02F 1/1345; G02F 1/1339
(52) U.S. Cl. .................. 349/190; 349/139; 349/149; 349/151; 349/153
(58) Field of Search ................. 349/139, 149, 349/151, 153, 190

(56) References Cited

U.S. PATENT DOCUMENTS

| | | | |
|---|---|---|---|
| 6,184,853 B1 | * | 2/2001 | Hebiguchi et al. ............ 345/88 |
| 2002/0093616 A1 | * | 7/2002 | Park et al. .................. 349/149 |
| 2003/0117165 A1 | * | 6/2003 | Kim et al. ................. 324/770 |

* cited by examiner

Primary Examiner—Julie-Huyen L. Ngo
(74) Attorney, Agent, or Firm—McKenna Long & Aldridge LLP (57) ABSTRACT

A liquid crystal display device includes first and second substrates facing and spaced apart from each other; a seal pattern between the first and second substrates, the seal pattern defining a display region; gate and data lines formed on the first substrates at the display region, the gate and data lines crossing each other; gate and data driving ICs (integrated circuits) on the first substrate at an exterior of the display region, the gate and data driving ICs being connected to the gate and data lines, respectively; a LOG (line-on-glass) line on the first substrate, the LOG line connecting the gate and data driving ICs and overlapping the seal pattern; and a passivation layer covering the LOG line and having first and second grooves, the first groove being disposed between adjacent LOG lines, the second groove being disposed over the LOG line.

16 Claims, 10 Drawing Sheets

LIQUID CRYSTAL DISPLAY DEVICE HAVING IMPROVED ADHESION OF A SEAL PATTERN

This application claims the benefit of Korean Patent Application No. 2001-50165, filed on Aug. 21, 2001, which is hereby incorporated by reference for all purposes as if fully set forth herein.

BACKGROUND OF THE INVENTION

1. Field of the Invention

The present invention relates to a liquid crystal display (LCD) device, and more particularly to a driving circuit portion of an LCD device.

2. Discussion of the Related Art

Flat panel display (FPD) devices having small size, lightweight, and low power consumption have been a subject of recent research in the coming of the information age. Among many kinds of FPD devices, LCD devices are widely developed and used because of their excellent characteristics of resolution, color display and display quality.

Generally, LCD devices include an upper substrate and a lower substrate facing each other with liquid crystal molecules interposed therebetween. Each substrate has an electrode on an inner surface thereof. An electric field is generated by applying a voltage to the electrodes, thereby driving the liquid crystal molecules to display images depending on light transmittance.

Figure 1:
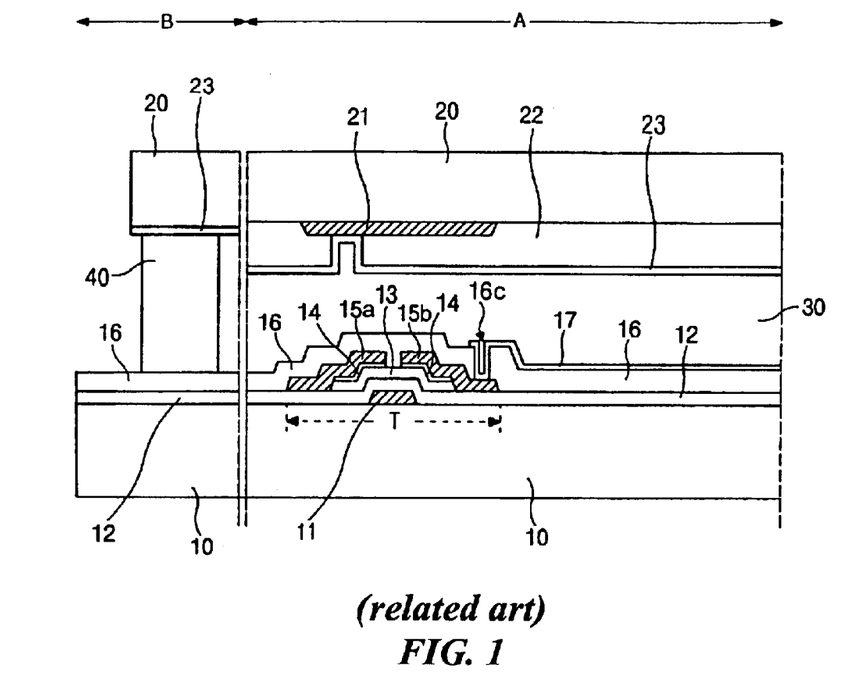
FIG. 1 is a schematic cross-sectional view of a conventional LCD device.

FIG. 1 is a schematic cross-sectional view of a conventional LCD device.

In FIG. 1, a conventional LCD device has a first region "A" where images are displayed, and a second region "B" where pads (not shown) connected to driving circuits to apply a signal to the first region "A" are disposed. At the first region "A", a gate electrode 11 of conductive material such as metal is formed on a first substrate 10. A gate insulating layer 12 of silicon nitride (SiNx) or silicon oxide ($SiO_2$) is formed on the gate electrode 11. An active layer 13 of amorphous silicon and an ohmic contact layer 14 of impurity-doped amorphous silicon are sequentially formed on the gate insulating layer 12 over the gate electrode 11. Source and drain electrodes 15a and 15b of conductive material such as metal are formed on the ohmic contact layer 14. The source and drain electrodes 15a and 15b compose a thin film transistor (TFT) "T" with the gate electrode 11. The gate electrode 11 is connected to a gate line (not shown) and the source electrode 15a is connected to a data line (not shown). The gate line and the data line cross each other and define a pixel region (not shown). A passivation layer 16 of SiNx, $SiO_2$ or organic insulating material is formed on the source and drain electrodes 15a and 15b. The passivation layer 16 has a contact hole 16c exposing the drain electrode 15b. A pixel electrode 17 of transparent conductive material is formed on the passivation layer 16 at the pixel region. The pixel electrode 17 is connected to the drain electrode 15b through the contact hole 16c.

A second substrate 20 faces and is spaced apart from the first substrate 10. A black matrix 21 corresponding to the TFT "T" is formed on an inner surface of the second substrate 20. The black matrix 21 covers portions except the pixel region. A color filter layer 22 is formed on the black matrix 21. The color filter layer 21 has red (R), green (G) and blue (B) colors that are alternately disposed. One color corresponds to one pixel region. A common electrode 23 of transparent conductive material is formed on the color filter layer 22. A liquid crystal layer 30 is interposed between the pixel electrode 17 and the common electrode 23.

The gate insulating layer 12 and the passivation layer 16 of the first substrate 10 and the common electrode 23 of the second substrate 20 are extended to the second region "B". A seal pattern 40 is formed between the passivation layer 16 and the common electrode 23 to supply a gap for injecting liquid crystal material and prevent the injected liquid crystal material from leaking.

The conventional LCD device is formed through fabricating processes including fabricating an array substrate, fabricating a color filter substrate, and assembling a liquid crystal cell. The array substrate has a TFT and a pixel electrode. The color filter substrate has a color filter layer and a common electrode. The liquid crystal cell assembling process includes attaching the array substrate and the color filter substrate, injecting liquid crystal material, sealing and attaching a polarizing plate.

On the other hand, the conventional LCD device further includes a driving unit to drive the TFT. The driving unit includes a driving integrated circuit (IC) to apply a signal to a line of the LCD device. Packaging methods of the driving IC to the LCD device are classified into a chip on glass (COG) type, a tape carrier package (TCP) type and a chip on film (COG) type. In the COG type, since the driving IC is attached onto an array substrate of the LCD device and an output electrode of the driving IC is directly connected to a pad of the array substrate, the structure and fabricating process are simple, and production cost is low.

Figure 2:
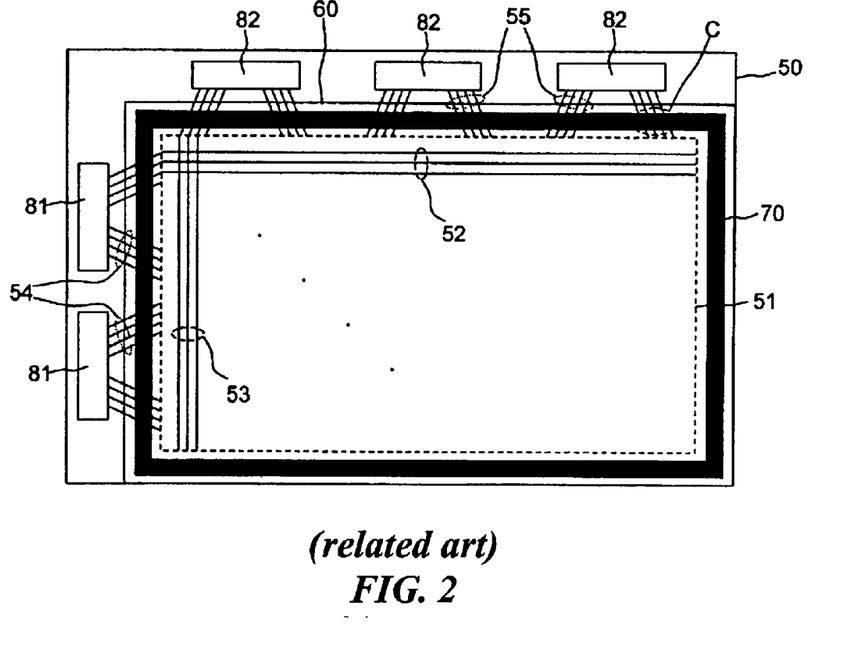
FIG. 2 is a plan view showing a conventional LCD device of a COG type.

FIG. 2 is a plan view showing a conventional LCD device of a COG type.

In FIG. 2, the conventional LCD device includes an array substrate 50 and a color filter substrate 60. The array substrate 50 has a larger area than the color filter substrate 60. A seal pattern 70 is formed at a boundary of the color filter substrate 60. Liquid crystal material (not shown) is interposed between the array substrate 50 and the color filter substrate 60 in interior of the seal pattern 70. The interior of the seal pattern 70 is a display region 51 where images are displayed. In the display region 51, gate lines 52 and data lines 53 cross each other and define pixel regions. A TFT (not shown) is disposed near a crossing of a gate line 52 and a data line 53. A gate link line 54 and a data link line 55 are formed at a left edge and a top edge of the array substrate 50, respectively. One end of the gate link line 54 is connected to the gate line 52, and the other end of the gate link line 54 is connected to a gate driving IC 81 packaged on the array substrate 50. One end of the data link line 55 is connected to the data line 53, and the other end of the data link line 55 is connected to a data driving IC 82 packaged on the array substrate 50. The gate driving IC 81 and the data driving IC 82 are connected to an external printed circuit board (PCB) (not shown) through a flexible printed circuit (FPC). Since the PCB includes many devices such as ICs, control signals and data signals are generated to drive an LCD device. Here, the PCB may be divided into a gate portion and a data portion, which are connected to each other through a FPC to interchange a gate signal and a data signal.

As mentioned above, the seal pattern 70 supplies a gap between the substrates 50, 60 for injecting liquid crystal material and prevents the injected liquid crystal material from being leaking. After a specific pattern of heat curable resin is formed on the array substrate 50, the array substrate 50 and the color filter substrate 60 are aligned and attached through hardening the seal patterning 70 under pressure.

As shown in FIG. 1, since a passivation layer 16 (of FIG. 1) is formed on an entire surface of an array substrate 10 (of FIG. 1), the passivation layer 16 (of FIG. 1) also exists beneath the seal pattern 40 (of FIG. 1). Recently, the passivation layer 16 (of FIG. 1) is made of organic insulating material such as benzocyclobutene (BCB) of low dielectric constant. Since adhesion of the seal pattern 40 (of FIG. 1) to the passivation layer 16 (of FIG. 1) of organic insulating material is bad, breakage in the seal pattern 40 (of FIG. 1) may occur. Accordingly, when the passivation layer 16 (of FIG. 1) is formed of organic insulating material, the passivation layer 16 (of FIG. 1) beneath the seal pattern 40 (of FIG. 1) should be eliminated to prevent the problems of a breakage.

Figure 3A:
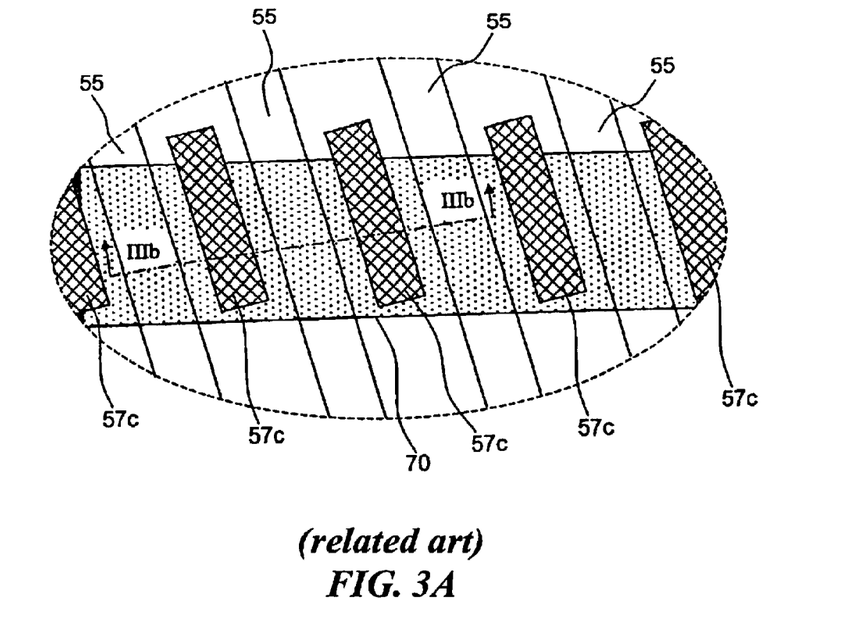
FIG. 3A is a schematic magnified plan view of a portion "C" of FIG. 2.
Figure 3B:
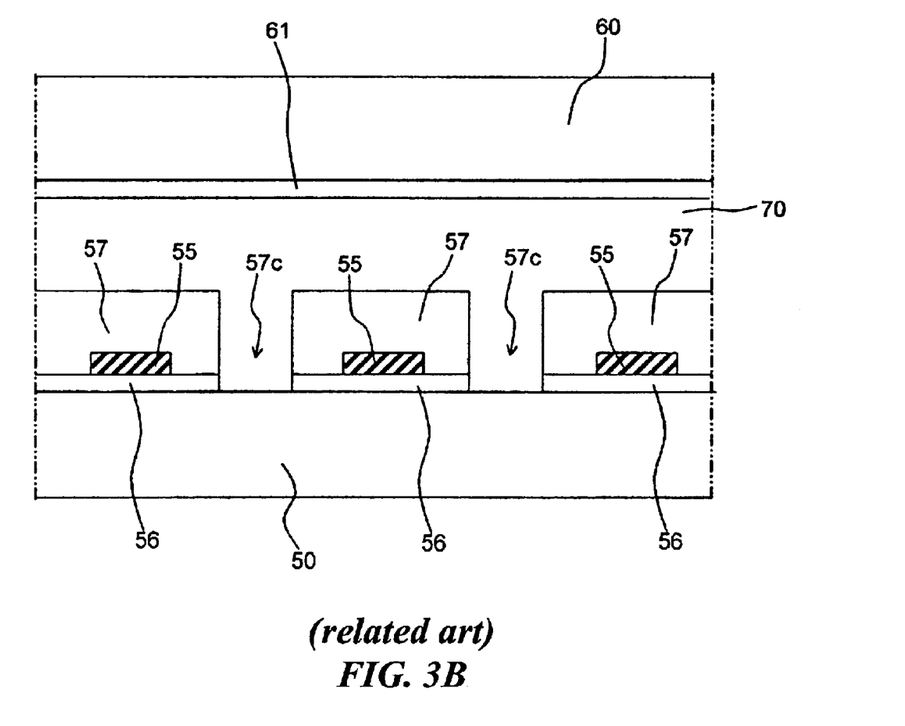
FIG. 3B is a schematic cross-sectional view taken along a line IIIb—IIIb of FIG. 3A.

FIG. 3A is a schematic magnified plan view of a portion "C" of FIG. 2, and FIG. 3B is a schematic cross-sectional view taken along a line IIIb—IIIb of FIG. 3A.

In FIGS. 3A and 3B, a gate insulating layer 56 is formed on an array substrate 50, and a data link line 55 is formed on the gate insulating layer 56. A passivation layer 57 of organic insulating material covers the data link line 55. A seal pattern 70 overlapping the data link line 55 is formed on the passivation layer 57. A color filter substrate 60 including a common electrode 61 is disposed over the seal pattern 70. The color filter substrate 60 is attached to the array substrate 50 by the seal pattern 70. To improve adhesion of the seal pattern 70, the passivation layer 57 has groove 57c between the adjacent data link lines 55 under the seal pattern 70 and through the gate insulating layer 56. Since a contact area of the seal pattern 70 and the passivation layer 57 is reduced, adhesion is improved and breakage of the seal pattern 70 is prevented.

Recently, in a COG type, a gate driving IC and a data driving IC are connected on an array substrate to simplify a FPC structure and a fabricating process. This method is referred to as a lines on glass (LOG) method.

Figure 4:
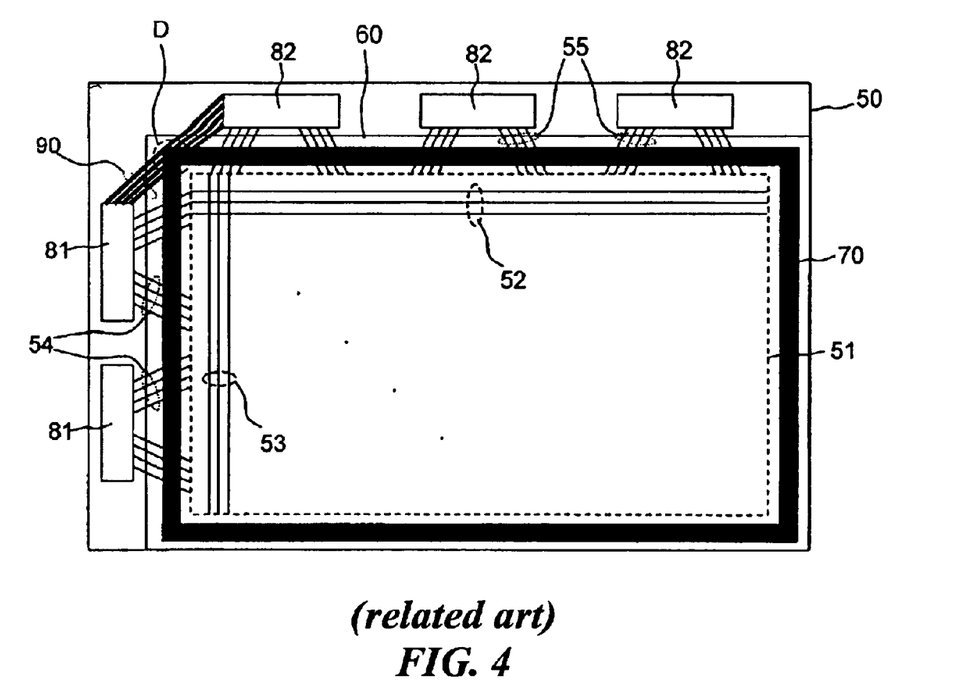
FIG. 4 is a schematic plan view of an LCD device using an LOG method.

FIG. 4 is a schematic plan view of an LCD device using an LOG method. Since the LCD device using an LOG method has the same structure as the conventional LCD device of FIG. 2 except LOG lines, illustrations for the same structure will be omitted.

In FIG. 4, a plurality of LOG lines 90 connecting a gate driving IC 81 and a data driving IC 82 are formed on an array substrate 50. Since the gate driving IC 81 and the data driving IC 82 are connected with the plurality of LOG lines 90 instead of a FPC, the fabricating process may be simplified and production cost may be reduced. In general, copper is used for the FPC because copper has very low resistivity among metallic materials. Accordingly, the plurality of LOG lines 90 should also have materials of low resistivity. Preferably, the plurality of LOG lines 90 are wide and short. Materials of low resistivity, for example, are aluminum (Al) or Al alloy. According to recent increase of display area, a gate line is made of Al or Al alloy to prevent a signal delay. Therefore, the plurality of LOG lines 90 may be formed through the same process as the gate line for reduction of fabricating steps and preserving low resistivity. However, since materials of Al or Al alloy are susceptible to chemicals such as etchant, it is preferable to form an additional metallic material such as molybdenum (Mo) on the Al or Al alloy.

On the other hand, since the plurality of LOG lines 90 are minimized in length to reduce resistance, the plurality of LOG lines 90 overlap the seal pattern 70. Therefore, a passivation layer (not shown) of organic insulating material should have grooves (not shown) between the plurality of LOG lines 90 to improve adhesion of the seal pattern 70.

Figure 5A:
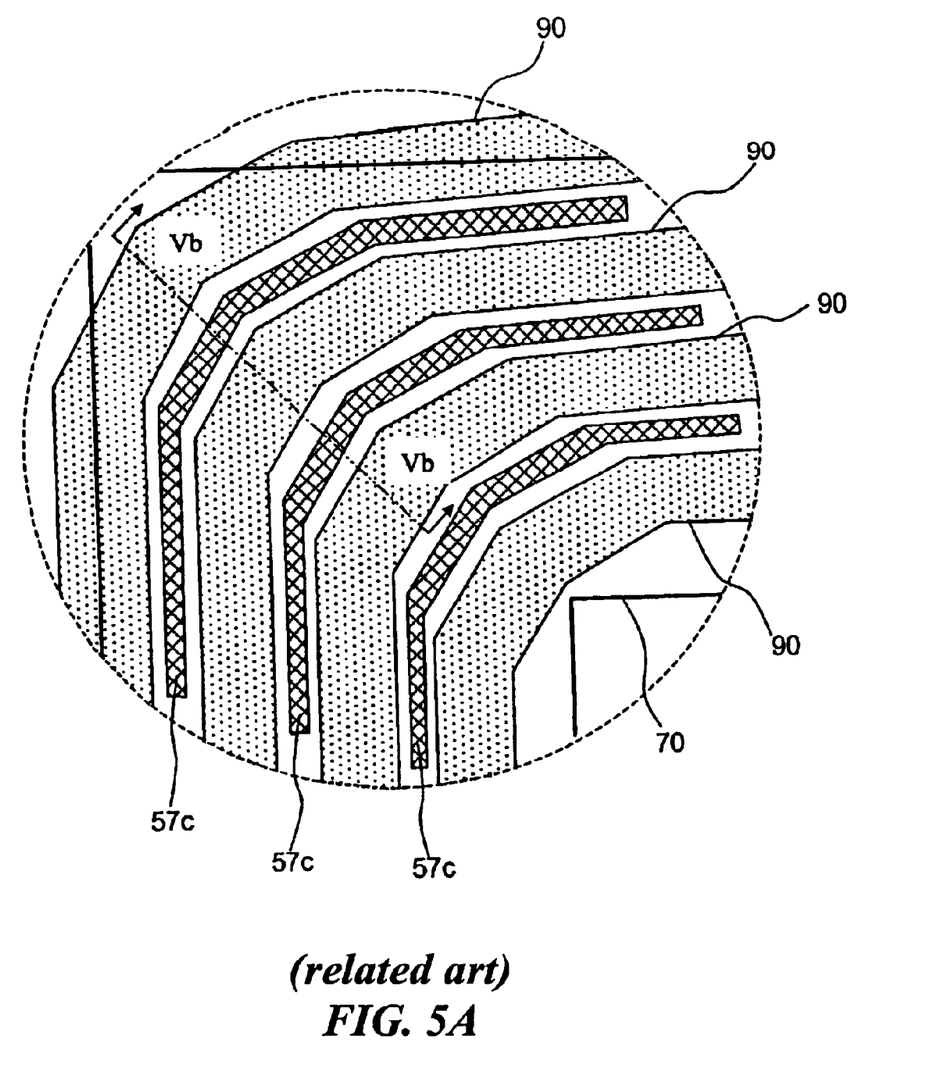
FIG. 5A is a schematic magnified plan view of a portion "D" of FIG. 4.
Figure 5B:
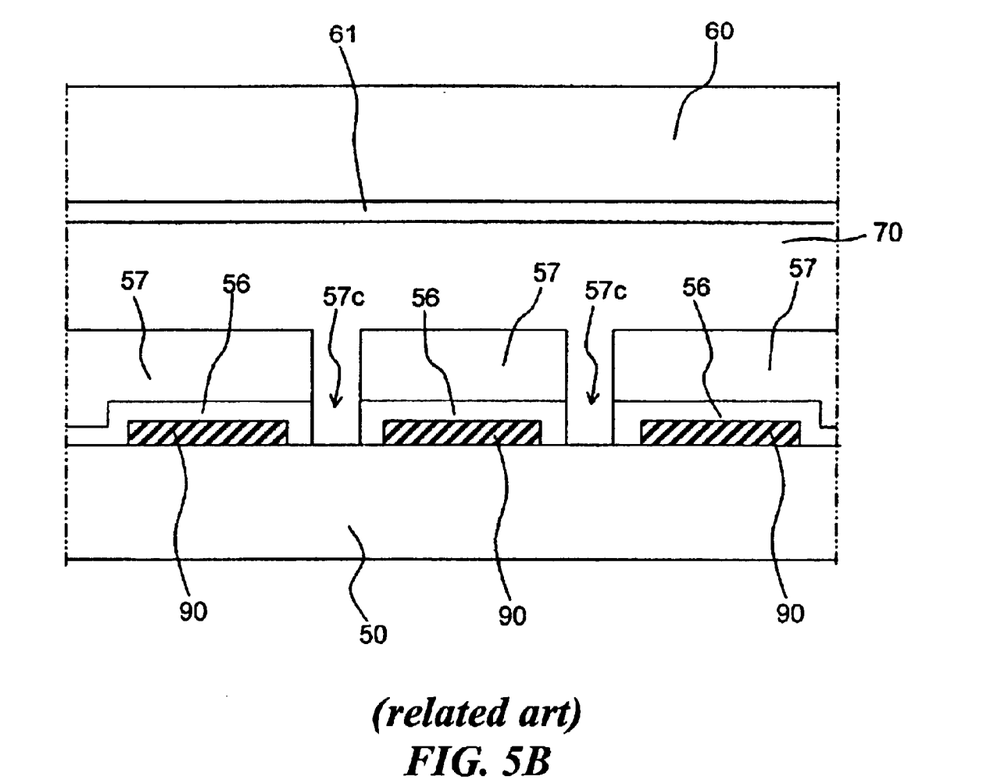
FIG. 5B is a schematic cross-sectional view taken along a line Vb—Vb of FIG. 5A.

FIG. 5A is a schematic magnified plan view of a portion "D" of FIG. 4, and FIG. 5B is a schematic cross-sectional view taken along a line Vb—Vb of FIG. 5A.

In FIGS. 5A and 5B, a plurality of LOG lines 90 of the same material as a gate line (not shown) are formed on an array substrate 50. The plurality of LOG lines 90 are spaced apart from each other. A gate insulating layer 56 and a passivation layer 57 of organic insulating material are sequentially formed on the plurality of LOG lines 90. The passivation layer 57 has grooves 57c between the adjacent LOG lines 90 and through the gate insulating layer 56. A seal pattern 70 is formed on the passivation layer 57. A color filter substrate 60 having a common electrode 61 is disposed over the seal pattern 70 and the seal pattern 70 attaches the color filter substrate 60 to the array substrate 50.

As mentioned above, a width of the LOG line 90 should be maximized to minimize its resistance. That is, the LOG line 90 is wider than the data link line (of FIGS. 3A and 3B). The width of the LOG line 90 is more than about twice the gap between the adjacent LOG lines 90. Accordingly, even though the passivation layer 57 under the seal pattern 70 between the adjacent LOG lines 90 is eliminated, the eliminated area is not large. As a result, an inferiority such as breakage of the seal pattern 70 may occur at a crossing portion of the plurality of LOG lines 90 and the seal pattern 70.

SUMMARY OF THE INVENTION

Accordingly, the present invention is directed to a liquid crystal display device that substantially obviates one or more of problems due to limitations and disadvantages of the related art.

An advantage of the present invention is to provide a liquid crystal display device using a line-on-glass (LOG) method where breakage of a seal pattern is prevented.

Additional features and advantages of the invention will be set forth in the description that follows, and in part will be apparent from the description, or may be learned by practice of the invention. Other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device includes: first and second substrates facing and spaced apart from each other; a seal pattern between the first and second substrates, the seal pattern defining a display region; gate and data lines formed on the first substrates at the display region, the gate and data lines crossing each other; gate and data driving ICs (integrated circuits) on the first substrate at an exterior of the display region, the gate and data driving ICs being connected to the gate and data lines, respectively; a LOG (line-on-glass) line on the first substrate, the LOG line connecting the gate and data driving ICs and overlapping the seal pattern; and a passivation layer covering the LOG line and having first and second grooves, the first groove being disposed between adjacent LOG lines, the second groove being disposed over the LOG line.

In another aspect, a liquid crystal display device includes: a first substrate having a display region and a non-display region; gate and data lines formed on the first substrates at the display region, the gate and data lines crossing each other; gate and data driving ICs (integrated circuits) on the first substrate at the non-display region, the gate and data driving ICs being connected to the gate and data lines, respectively; a LOG (line-on-glass) line on the first substrate at the non-display region, the LOG line connecting the gate and data driving ICs; a passivation layer covering the LOG line and having first and second grooves, the first groove being disposed between adjacent LOG lines, the second groove being disposed over the LOG line; a seal pattern on the passivation layer, the seal pattern covering the first and second grooves; and a second substrate on the seal pattern.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to the illustrated embodiments of the present invention, examples of which are illustrated in the accompanying drawings. Wherever possible, similar reference numbers will be used throughout the drawings to refer to the same or like parts.

Figure 6:
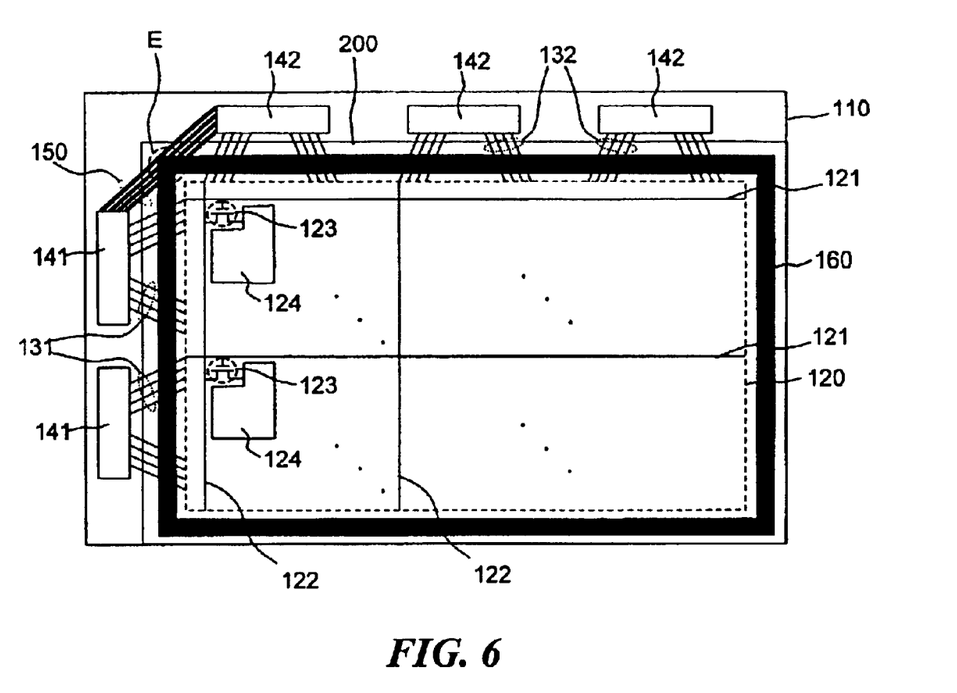
FIG. 6 is a schematic plan view of an LCD device according to an exemplary embodiment of the present invention.

FIG. 6 is a schematic plan view of an LCD device according to an exemplary embodiment of the present invention.

In FIG. 6, an array substrate 110 includes a display region 120 where images are displayed. Gate lines 121, data lines 122, and thin film transistors (TFTs) 123 in a matrix and pixel electrodes 124 are disposed at the display region 120. The TFT 123 is connected to a respective gate line 121 and a respective data line 122. A respective pixel electrode 124 of transparent material such as indium-tin-oxide (ITO) and indium-zinc-oxide (IZO) is connected to the TFT 123. Gate link lines 131 and data link lines 132 are disposed at an exterior of the display region to transfer a signal to the gate lines 121 and the data lines 122. A gate driving IC 141 and a data driving IC 142 at a boundary of the array substrate 110 is connected to the gate link lines 131 and the data link lines 132, respectively. A LOG line 150 connecting the gate driving IC 141 and the data driving IC 142 is disposed at an edge of the array substrate 110. Further, the gate driving IC 141 and the data driving IC 142 are connected to an external PCB (not shown).

A color filter substrate 200 is disposed over the array substrate 120. A seal pattern 160 defining the display region 120 is formed between the array substrate 120 and the color filter substrate 200. The seal pattern 160 attaches the array substrate 120 and the color filter substrate 200. Here, the seal pattern 160 crosses the LOG line 150, the gate link lines 131 and the data link lines 132. The LOG line 150 may have the same material as the gate lines 121. Preferably, the gate line 121 is made of aluminum (Al) or Al alloy having a low resistivity. A metal layer such as molybdenum (Mo) may be formed on the Al or Al alloy layer to prevent corrosion.

Figure 7:
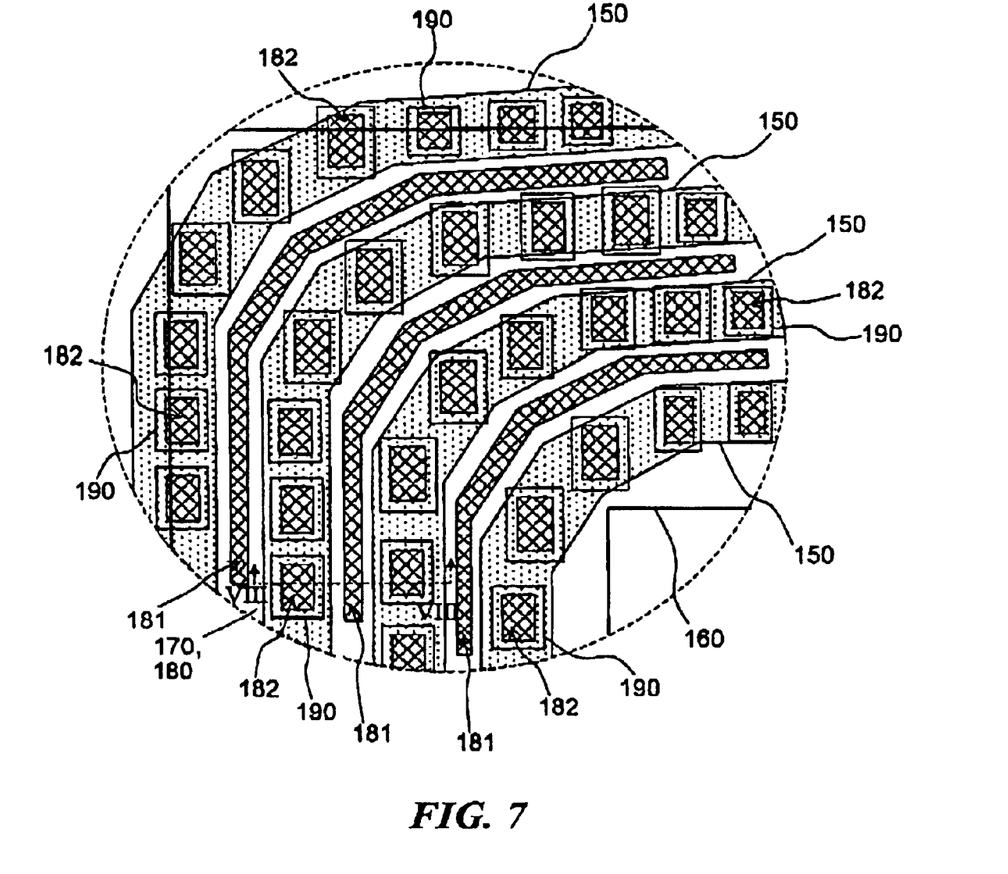
FIG. 7 is a schematic magnified plan view of a portion "E" of FIG. 6.
Figure 8:
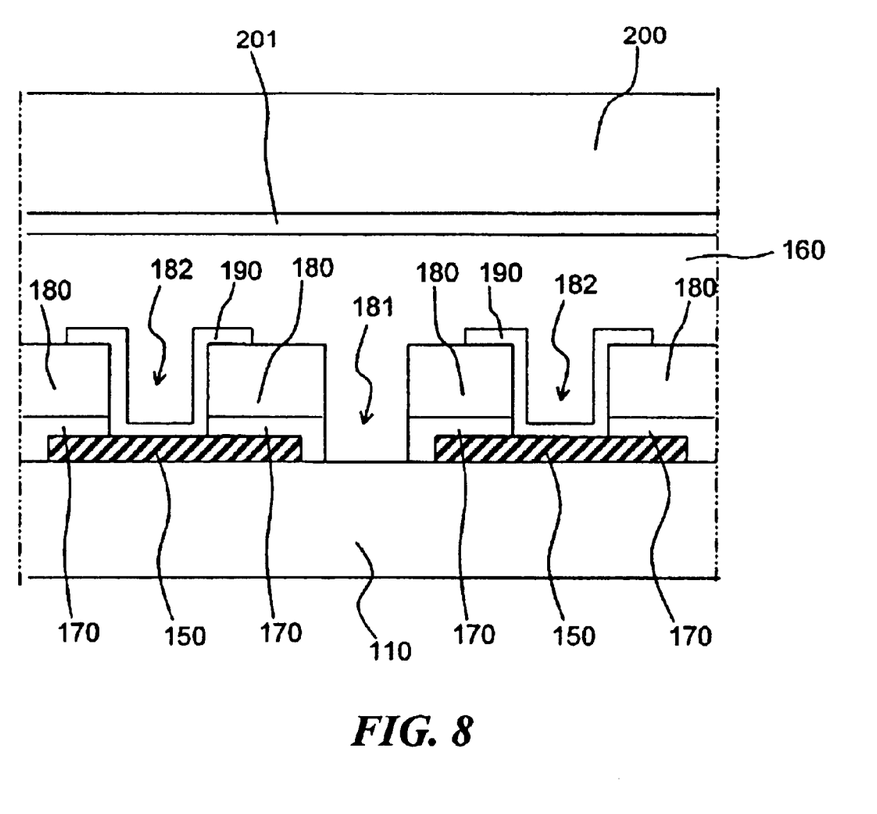
FIG. 8 is a schematic cross-sectional view taken along a line VIII—VIII of FIG. 7.

FIG. 7 is a schematic magnified plan view of a portion "E" of FIG. 6, and FIG. 8 is a schematic cross-sectional view taken along a line VIII—VIII of FIG. 7.

In FIGS. 7 and 8, a LOG line 150 of the same material as a gate line 121 (of FIG. 6) is formed on an array substrate 110. A gate insulating layer 170 of silicon nitride ($SiN_x$) or silicon oxide ($SiO_2$) and a passivation layer 180 of organic material are sequentially formed on the LOG line 150. The passivation layer 180 has a first groove 181 between the adjacent LOG lines 150. The first groove 181 is also formed through the gate insulating layer 170 to expose the array substrate 110. A second groove 182 through the passivation layer 180 exposes the LOG line 150. A first protection layer 190 of the same transparent conductive material as the pixel electrode 124 (of FIG. 6) is formed on the passivation layer 180 and connected to the LOG line 150 through the second groove 182. The first protection layer 190 covering the second groove 182 prevents an electrical open of the LOG line 150 exposed by the second groove 182. A seal pattern 160 is formed over the first protection layer 190. A color filter substrate 200 having a common electrode 201 is disposed on the seal pattern 160 in such a way that the common electrode 201 contacts the seal pattern 160. The color filter substrate 200 is attached to the array substrate 110 through the seal pattern 160.

As mentioned above, adhesion of the seal pattern to the passivation layer of organic material is bad. However, since not only the passivation layer between the adjacent LOG lines but also the passivation layer over the LOG line is eliminated, contact area of the passivation layer and the seal pattern is reduced. Accordingly, adhesion of the seal pattern is improved.

Figure 9:
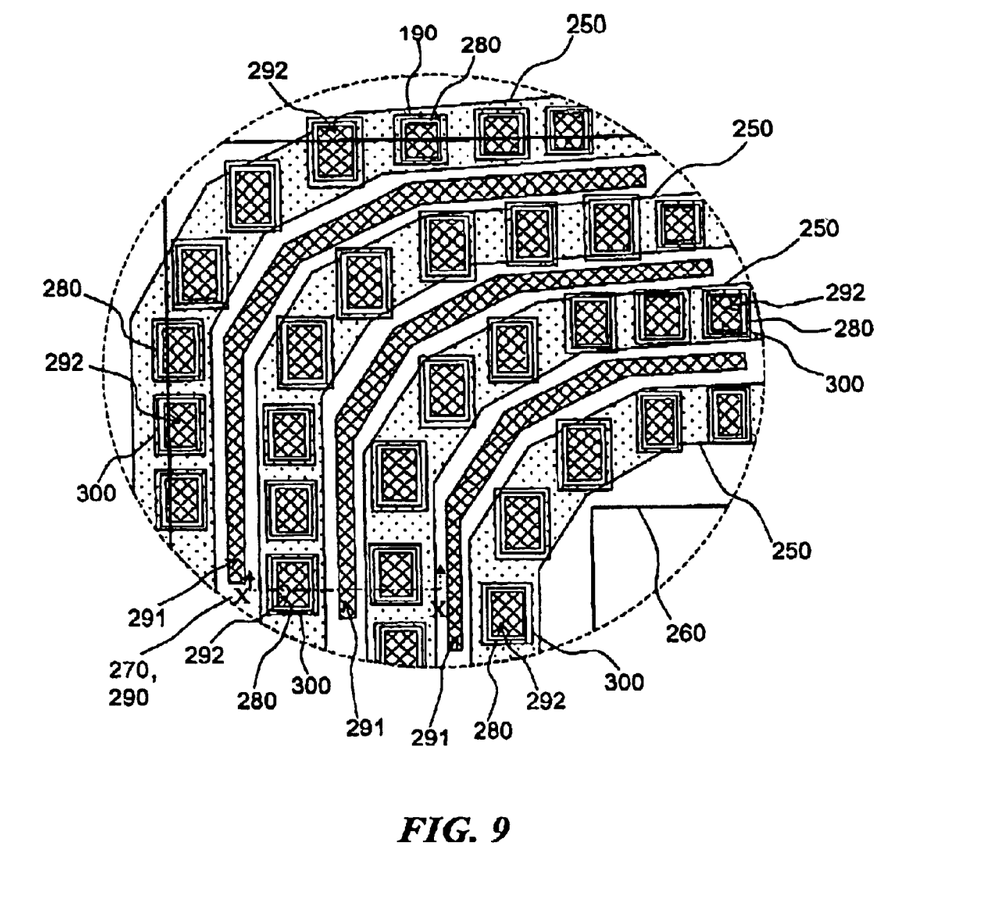
FIG. 9 is a schematic plan view of an LCD device according to another exemplary embodiment of the present invention.
Figure 10:
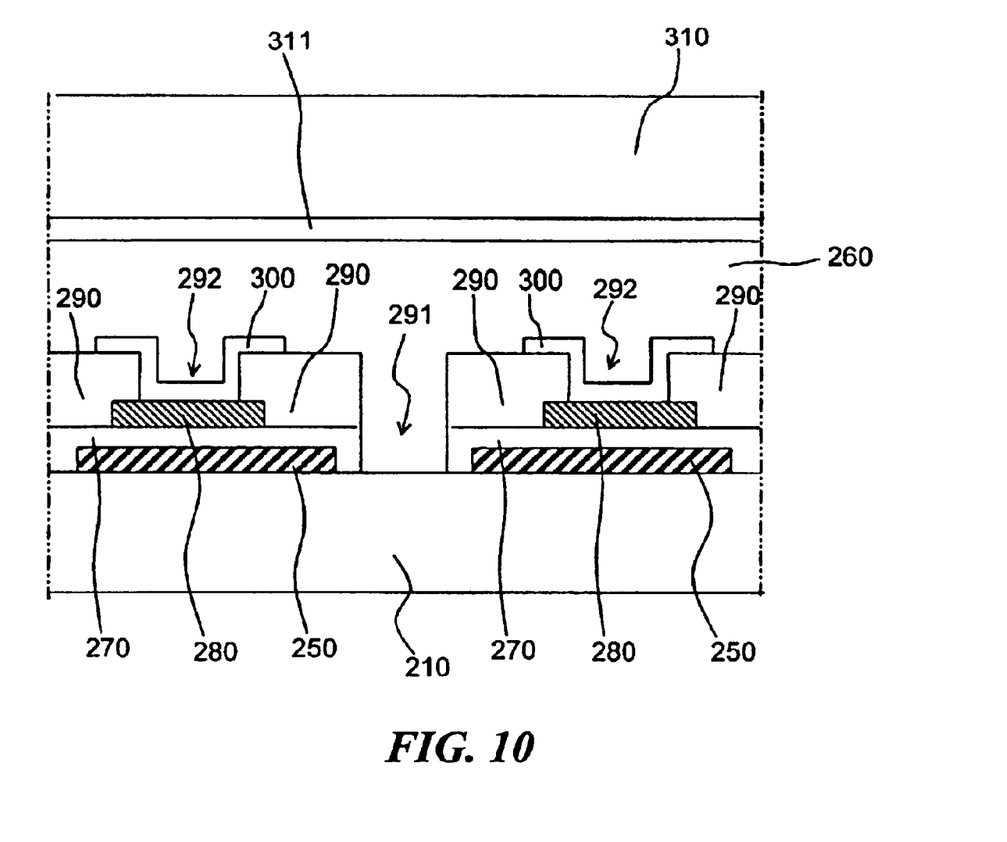
FIG. 10 is a schematic cross-sectional view taken along a line X—X of FIG. 9.

FIG. 9 is a schematic plan view of an LCD device according to another exemplary embodiment of the present invention and FIG. 10 is a schematic cross-sectional view taken along a line X—X of FIG. 9. FIG. 9 is a magnified view corresponding to FIG. 7.

In FIGS. 9 and 10, an LOG line 250 is formed on an array substrate 210 and a gate insulating layer 270 is formed on the LOG line 250. A first protection layer 280 of the same material as the data line 122 (of FIG. 6) is formed on the gate insulating layer 279 over the LOG line 250. A passivation layer 290 of organic material is formed on the first protection layer 280. The passivation layer 290 has a first groove 291 between the adjacent LOG lines 250. The first groove 291 is also formed through the gate insulating layer 270 to expose the array substrate 210. A second groove 292 through the passivation layer 290 exposes the first protection layer 280. A second protection layer 300 of the same transparent conductive material as the pixel electrode 124 (of FIG. 6) is formed on the passivation layer 290 and is connected to the first protection layer 280 through the second groove 292. The second protection layer 300 covers the second groove 292. Here, the first protection layer 280 prevents the LOG line 250 from being etched when the passivation layer 290 is patterned. The second protection layer 300 prevents an electrical open of the LOG line 250 by covering the second groove 292. The second protection layer 300 may be omitted. A seal pattern 260 is formed over the second protection layer 300. A color filter substrate 310 having a common electrode 311 is disposed on the seal pattern 260 in such a way that the common electrode 311 contacts the seal pattern 260. The color filter substrate 310 is attached to the array substrate 210 through the seal pattern 260.

In this exemplary embodiment of the present invention, damage of an LOG line during a passivation layer patterning is prevented by forming a protection layer of the same material as a data line over an LOG line. Moreover, since a contact area of a seal pattern and a passivation layer is minimized, adhesion of a seal pattern is improved.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
   first and second substrates facing and spaced apart from each other;
   a seal pattern between the first and second substrates, the seal pattern defining a display region;
   gate and data lines formed on the first substrates at the display region, the gate and data lines crossing each other;
   gate and data driving integrated circuits (ICs) on the first substrate at an exterior of the display region, the gate and data driving ICs being connected to the gate and data lines, respectively;
   a LOG (line-on-glass) line on the first substrate, the LOG line connecting the gate and data driving ICs and overlapping the seal pattern; and
   a passivation layer covering the LOG line and having first and second grooves, the first groove being disposed between adjacent LOG lines, the second groove being disposed over the LOG line.

2. The device according to claim 1, wherein the LOG line has the same material as the gate line.

3. The device according to claim 2, wherein the gate line has one of aluminum and aluminum alloy.

4. The device according to claim 1, further comprising a first protection layer between the passivation layer and the seal pattern, the protection layer covering the second groove.

5. The device according to claim 4, further comprising a thin film transistor and a pixel electrode, the thin film transistor being connected to respective gate and data lines, the pixel electrode being connected to the thin film transistor.

6. The device according to claim 5, wherein the first protection layer has the same material as the pixel electrode.

7. The device according to claim 6, wherein the pixel electrode has one of indium-tin-oxide and indium-zinc-oxide.

8. The device according to claim 7, further comprising a second protection layer between the LOG line and the passivation layer, the second protection layer corresponding to the second groove.

9. The device according to claim 8, wherein the second protection layer has the same material as the data line.

10. The device according to claim 1, further comprising a second protection layer between the LOG line and the passivation layer, the second protection layer corresponding to the second groove.

11. A liquid crystal display device, comprising:
    a first substrate having a display region and a non-display region;
    gate and data lines formed on the first substrates at the display region, the gate and data lines crossing each other;
    gate and data driving integrated circuits (ICs) on the first substrate at the non-display region, the gate and data driving ICs being connected to the gate and data lines, respectively;
    a LOG (line-on-glass) line on the first substrate at the non-display region, the LOG line connecting the gate and data driving ICs;
    a passivation layer covering the LOG line and having first and second grooves, the first groove being disposed between adjacent LOG lines, the second groove being disposed over the LOG line;
    a seal pattern on the passivation layer, the seal pattern covering the first and second grooves; and
    a second substrate on the seal pattern.

12. The device according to claim 11, wherein the LOG line has the same material as the gate line.

13. The device according to claim 12, wherein the gate line has one of aluminum and aluminum alloy.

14. The device according to claim 11, further comprising a first protection layer between the passivation layer and the seal pattern, the first protection layer covering the second groove.

15. The device according to claim 14, wherein the first protection layer has transparent conductive material.

16. The device according to claim 15, further comprising a second protection layer between the LOG line and the passivation layer, the second protection layer being connected to the first protection layer through the second groove.

* * * * *